United States Patent
Deogon et al.

(10) Patent No.: US 9,447,291 B2
(45) Date of Patent: Sep. 20, 2016

(54) HIGH HEAT RESISTANT COMPOSITION

(71) Applicant: AKZO NOBEL COATINGS INTERNATIONAL B.V., Arnhem (NL)

(72) Inventors: Malkit Singh Deogon, West Midlands (GB); Manmohan Singh Deogon, West Midlands (GB)

(73) Assignee: Akzo Nobel Coatings International B.V., Arnhem (NL)

(*) Notice: Subject to any disclaimer, the term of this patent is extended or adjusted under 35 U.S.C. 154(b) by 0 days.

(21) Appl. No.: 14/416,829

(22) PCT Filed: Jul. 26, 2013

(86) PCT No.: PCT/EP2013/065775
§ 371 (c)(1),
(2) Date: Jan. 23, 2015

(87) PCT Pub. No.: WO2014/019947
PCT Pub. Date: Feb. 6, 2014

(65) Prior Publication Data
US 2015/0175816 A1    Jun. 25, 2015

(30) Foreign Application Priority Data
Jul. 30, 2012  (EP) .................................... 12178402

(51) Int. Cl.
| | |
|---|---|
| C09D 5/18 | (2006.01) |
| C09D 7/12 | (2006.01) |
| C08L 63/00 | (2006.01) |
| C09D 163/00 | (2006.01) |
| C08K 5/00 | (2006.01) |
| C08K 5/17 | (2006.01) |
| C08K 5/20 | (2006.01) |
| C08K 5/5333 | (2006.01) |

(52) U.S. Cl.
CPC .............. C09D 5/185 (2013.01); C08L 63/00 (2013.01); C09D 7/1241 (2013.01); C09D 163/00 (2013.01); C08K 5/0066 (2013.01); C08K 5/17 (2013.01); C08K 5/20 (2013.01); C08K 5/5333 (2013.01)

(58) Field of Classification Search
None
See application file for complete search history.

(56) References Cited

U.S. PATENT DOCUMENTS

| | | | |
|---|---|---|---|
| 4,595,714 A * | 6/1986 | McAllister et al. | 523/179 |
| 4,965,296 A | 10/1990 | Hastings | |
| 5,070,119 A * | 12/1991 | Nugent et al. | 523/179 |
| 5,372,846 A * | 12/1994 | Feldman et al. | 427/224 |
| 5,925,457 A | 7/1999 | McGinniss et al. | |
| 6,096,812 A | 8/2000 | Hanafin et al. | |
| 2004/0054035 A1* | 3/2004 | Hallissy et al. | 523/219 |
| 2006/0069185 A1 | 3/2006 | He et al. | |

FOREIGN PATENT DOCUMENTS

| | | |
|---|---|---|
| EP | 2392603 | 7/2011 |
| GB | 2159522 | 12/1985 |
| WO | 91/11498 | 8/1991 |
| WO | 97/01596 | 1/1997 |
| WO | 97/19764 | 6/1997 |
| WO | 98/03052 | 1/1998 |
| WO | 2010/054984 | 5/2010 |
| WO | 2012/101042 | 8/2012 |
| WO | WO 2012/076905 * | 6/2014 |

OTHER PUBLICATIONS

European Search Report for Application No. 12178402.9-2102 dated Jan. 14, 2013.
International Search Report and Written Opinion for Application No. PCT/EP2013/065775 mailed on Aug. 26, 2013.

* cited by examiner

*Primary Examiner* — Marc Zimmer
(74) *Attorney, Agent, or Firm* — McDonnell Boehnen Hulbert & Berghoff LLP

(57) ABSTRACT

The invention relates to a composition that can be used as a coating and that can protect a substrate coated with this composition from high heat. The composition comprises: -a polysulfide, -an epoxy resin, -a compound selected from compounds having a secondary and/or a tertiary amine group, and compounds having an amide group, -a phosphonate, -fibres and -less than 1 wt. % of a polysiloxane, wherein the wt. % is relative to the weight of the composition after evaporation of any solvent that is present in the composition.

18 Claims, No Drawings

HIGH HEAT RESISTANT COMPOSITION

REFERENCE TO RELATED APPLICATIONS

This application is the U.S. National Phase of PCT/EP2013/065775, filed on Jul. 26, 2013, and claims the benefit of EP Application No. 12178402.9, filed on Jul. 30, 2012.

The present invention relates to a composition that can be used to improve the fire and high heat resistance of substrates or structures coated with such composition, in particular compositions that will expand when exposed to high heat or fire conditions to form a substantially stable and protective carbonaceous char.

Many materials, such as steel, rapidly lose their strength and fail due to a loss in structural integrity in a fire. Structural collapse of "high-rise" office blocks, oil and gas facilities or other infrastructure, and process vessel or pipe work rupture as a result of a fire can be catastrophic in terms of escalation of the incident, damage to property, and even loss of life.

Intumescent coatings are used on many structures to delay the effects of a fire. The coating slows the rate of temperature increase of the substrate to which the coating is applied. The coating thus increases the time before the structure fails due to the heat of fire. The extra time makes it more likely that fire fighters will be able to extinguish the fire or at least apply cooling water before the structure fails.

Intumescent coatings generally contain some form of resinous binder, for example a crosslinked high-temperature polymer such as an epoxy resin or a vinyl toluene/styrene acrylic polymer. The resinous binder forms the hard coating. If an epoxy resin is present in the binder, the binder also provides a source of carbon, which, in a fire, is converted to a char.

A range of methods is known in the art for treating inflammable or heat sensitive substrates such as building materials, for example structural wood or steelwork, interior decorative materials, for example plywood or medium and high density fiber panels, or insulated electric wiring. In GB 2159522 an ablative coating system is disclosed comprising a reactive mixture of epoxy and polysulfide resins, an amine curing agent, inorganic materials, and carbonaceous pre-ox fibers. This coating can provide thermal protection in a high temperature, erosive environment.

In U.S. Pat. No. 4,965,296 a fire retardant coating materials is disclosed that includes a fluid intumescent material and conductive particles of various sizes.

In U.S. Pat. No. 5,925,457 an intumescent coating system is disclosed comprising two different foam components. The two foam components are provided in a laminate-type arrangement, which puts restrictions to the way this system can be applied to surfaces that need to be protected from a fire.

In U.S. Pat. No. 6,096,812 a low density, epoxy-based intumescent fire resistive coating, having a density below about 1.10 grams/cc, and a method for forming the same, are disclosed. This method includes the steps of forming an epoxy-based intumescent mastic, having minute particles of amorphous silica dispersed therein. The mastic is then sprayed in droplets on at least one surface of a substrate to form a low density mastic coating on the surface. The low density mastic coating then cures to form a low density, intumescent fire resistive coating. In this publication Chartek® type coating compositions are described.

In WO 91/11498 a system is disclosed based on a combination of comparatively small amounts (e.g. 3-20 wt %) of exfoliable laminar minerals such as expandable graphite with one or more binders and one or more of a range of intumescent char-forming materials such as carbonifics, acids and acid-yielding catalysts, blowing agents, char-formers and stabilisers.

In WO 97/01596 a thin-film intumescent composition is disclosed for protecting a substrate against fire and thermal extremes, which includes a polymer binder, a solvent, a carbonific, a spumific, a catalyst, and at least some additives chosen from a source of carbon, finely divided elemental boron, a metal stearate adduct with alumina, and a conjugated fatty acid. The compositions provide chars having greatly increased efficiency, greater thickness, better physical characteristics including cell structure and physical toughness, and greater resistance to oxidation by fires and by chemicals present in fires.

In WO 97/19764 a heat ablative coating composition is disclosed comprising an epoxy silane resin, an epoxy resin, a silicone intermediate, a silicon modified polyether, an aminosilane, an organometallic catalyst, an organic solvent, water and a filler. It takes about one week at ambient temperature to cure this coating, which is relatively long.

In WO 98/03052 intumescent coating compositions are disclosed comprising a non-silicone based polymer as a binder and a small amount of platinum. The compositions also comprise tetrafluoroborate salts. In a preferred embodiment, the binder is an epoxy polysulfide resin.

In WO 2010/054984 an intumescent composition is disclosed comprising: A) a binder comprising (i) a resin comprising a polysiloxane chain or a precursor for said chain, (ii) optionally an organic resin, and (iii) at least one type of functional group selected from the group consisting of epoxy, amine, mercaptan, carboxylic acid, acryloyl, isocyanate, alkoxysilyl, and anhydride groups, said functional groups being present as pendant and/or terminal groups on said resin comprising a polysiloxane chain or the precursor for said chain, and/or on the organic resin, provided that if the binder contains alkoxysilyl groups as the only type of said functional groups, these alkoxysilyl groups are present on the organic resin, B) a compound capable of reacting with or catalysing the reaction between the functional groups, and C) a spumific and a char forming adjunct With the exception of U.S. Pat. No. 6,096,812, none of the above patent publications have resulted in any coating system with properties equal to or even better than one of the best performing systems that is commercially available at present, viz. Chartek® 7 and Chartek® 8 (both ex International Protective Coatings/AkzoNobel). Chartek® 7 is an epoxy-based fire protection coating that primarily acts as a barrier coating to prevent corrosion of a steel substrate. In a fire, this coating insulates the steel from reaching critical failure temperatures. Currently, Chartek® 7 is the only fire protection coating that achieved the protective coating standard Norsok M501 (revision 5) without the need to apply a separate topcoat, which means that this product/system 1) provides optimal protection of the installation 2) with a minimum need for maintenance (so is maintenance friendly), and 3) is application friendly.

This Norsok M501 test is also referred to as weatherability or durability test

One of the methods to evaluate the fire resistant properties of a substrate is to expose the substrate to a jet fire in accordance with test method ISO22899. Chartek® 7 provides a protection against a jet fire of approximately 60 minutes at a dry film thickness of 10 mm. There is a clear need for products which provide protection against a jet fire for longer times, well over 60 minutes at a dry film thickness of 10 mm.

It was found that the composition according to the present invention can provide a substrate protection against a jet fire in accordance with test method ISO22899 that is significantly better than Chartek® 7 or Chartek® 8. This significant increase is a step change in comparison to intumescent and/or fire resistant products that are currently available. It was further found that the composition according to the present invention also generates less smoke when tested in accordance with IMO Resolution MSC 61(67).

Another method to evaluate the fire resistant properties of a substrate is to expose the substrate to a pool fire, also referred to as hydrocarbon performance. This hydrocarbon performance can be tested according to BS476 part 20 (Method for determination of the fire resistance of elements of construction). The composition according to the present invention also shows a better hydrocarbon performance than products currently available on the market.

None of the documents referred to above provide any clear guidance on how a composition can be obtained that shows a good jet fire resistance in combination with also a good pool fire resistance. The main reason for this is that currently little information is known on how the various components in the composition interact with each other, in particular when they are exposed to the high temperatures and/or erosive environment of a jet fire or a pool fire. The products that are on the market show either a good jet fire resistance or a good pool fire resistance, never a combination of both properties.

Surprisingly, a coating composition was found that shows a superior jet fire resistance (better than currently known systems), a very good pool fire resistance, a low level of smoke generation, and a good weatherability performance. The heat resistant composition in accordance with the present invention comprises:
a polysulfide,
an epoxy resin,
a compound selected from compounds having a secondary and/or a tertiary amine group, and compounds having an amide group,
a phosphonate,
fibres, and
less than 1 wt. % of a polysiloxane
wherein the wt. % is relative to the weight of the composition after evaporation of any solvent that is present in the composition Within the framework of the present invention,
a primary amine group is a group wherein a nitrogen atom is directly connected to two hydrogen atoms, this can be represented as $R^1NH_2$ (wherein $R^1$ can be any organic group, except hydrogen)
a secondary amine group is a group wherein a nitrogen atom is directly connected to one hydrogen atoms, this can be represented as $R^1R^2NH$ (wherein $R^1$ and $R^2$ can be any organic group, except hydrogen),
a tertiary amine group is a group wherein a nitrogen atom is not directly connected to a hydrogen atom, this can be represented as $R^1R^2R^3N$ (wherein $R^1$, $R^2$ and $R^3$ can be any organic group, except hydrogen)
an amide group is a group wherein a nitrogen atom is attached to a carbonyl, this can be represented as $R^1CONR^2R^3$ (wherein $R^1$, $R^2$, and $R^3$ can be any organic group, including hydrogen)

In general, a fire resistant and/or intumescent composition can be characterised by ingredients having the following function(s):
a resinous binder,
a source of carbon,
a carbon conversion enhancer,
a spumific,
an enhancer for the stability and/or strength of the char, and
various additives to improve wetting/surface tension/mar resistance/etc.

Some of the ingredients in the composition may only have one function, other ingredients can have two or multiple functions in the composition.

In the composition according to the present invention, the polysulfide is one of the ingredients of the resinous binder.

Suitable polysulfides can be obtained by the polycondensation of bis-(2-chloroethyl-) formal with alkali polysulfide. During this reaction, the chain length and branching can be varied, depending on reaction time and the introduction of additional components to the reaction. Polysulfides are normally medium to high viscous liquids of a light brown color. Suitable polysulfides can have various termination groups.

In one embodiment, the polysulfide is a polysulfide polymer. In another embodiment, the composition comprises a mixture of two or more different types of polysulfides, for example a mixture of two or more different types of polysulfide polymers.

In a further embodiment, the polysulfides have a molecular weight <1500 g/mol and a SH-content >5%.

Suitable polysulfides include Thioplast G (ex AkzoNobel), and Thiokol LP2 and LP3-type products (all ex. Morton Thiokol)

In the composition according to the present invention, the epoxy resin is another ingredient of the resinous binder.

Suitable epoxy-functional resins include (i) polyglycidyl ethers derived from such polyhydric alcohols as ethyleneglycol, diethyleneglycol, triethyleneglycol, 1,2-propyleneglycol, 1,4-butyleneglycol, 1,5-pentanediol, 1,2,6-hexanetriol, glycerol, thrimethylolpropane, bisphenol-A (a condensation product of acetone and phenol), bisphenol-F (a condensation product of phenol and formaldehyde), hydrogenated bisphenol-A, or hydrogenated bisphenol-F, (ii) polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid, (iii) epoxidised olefinically unsaturated alicyclic materials such as epoxy alicyclic ethers and esters, (iv) epoxy resins containing oxyalkylene groups, (v) epoxy novolac resins, which are prepared by reacting an epihalohydrin (e.g. epichlorohydrin) with the condensation product of an aldehyde with a monohydric or polyhydric phenol (e.g. phenol-formaldehyde condensate), and (vi) mixtures thereof. The epoxy-functional resin preferably has an epoxy equivalent weight in the range of 100 to 5,000, more preferably 180-1,000 g/eq.

In one embodiment, the epoxy resin is a bisphenol-type epoxy resin. In another embodiment, the composition comprises a mixture of two or more different types of epoxy resins, for example a mixture of two or more different types of bisphenol-type epoxy resins or a mixture comprising a bisphenol A-type epoxy resin and an aliphatic epoxy resin. In particular good results can be obtained when a mixture is used of 100 parts by weight of bisphenol A-type epoxy resin and 1-50 parts by weight of an aliphatic epoxy resin.

In the composition according to the present invention, the compound selected from compounds having a secondary and/or a tertiary amine group, and compounds having an amide group is an ingredient of the spumific, but can also act as an ingredient for the resinous binder.

A spumific provides expansion gas as it decomposes in the heat of a fire. It is desirable that the spumific gives off gas at a temperature at which the resinous binder is soft but which is below the temperature at which the char is formed. In this way, the char which is formed is expanded and is a better insulator. The compound selected from compounds having a secondary and/or a tertiary amine group, and compounds having an amide group can be selected from melamine, melamine formaldehyde, methylolated melamine, hexamethoxymethylmelamine, melamine monophosphate, melamine biphosphate, melamine polyphosphate, melamine pyrophosphate, urea, dimethylurea, butylated urea, alkylated urea, benzoguanamine, glycoluril type compounds, tris(alkoxycarbonylamino) triazine type compounds, and, guanylurea.

In one embodiment, the compound selected from compounds having a secondary and/or a tertiary amine group, and compounds having an amide group is a methylated melamine or urea resin. In another embodiment, the composition comprises a mixture of two or more different types of compounds selected from compounds having a secondary and/or a tertiary amine group, and compounds having an amide group, for example a mixture of two or more different types of methylated melamine resins.

Examples of suitable compounds having a secondary and/or a tertiary amine group, and compounds having an amide group include Cymel 301, Cymel 303LF, Cymel 323, Cymel 325, Cymel 327, Cymel 328, Cymel 350, Cymel 370, Cymel 373, Cymel 3745, Cymel 3749, Cymel 385, Cymel UM15, Cymel UM80, and Cylink 2000 (All ex Cytec).

Other suitable compounds having a secondary and/or a tertiary amine group, and compounds having an amide group include dialkylamino alkyl functional phenolic compounds, such as Ancamine K54 and DMP-30

In the composition according to the present invention, phosphonates are one of the ingredients that can enhance the stability and/or strength of the char. Phosphonates are organic compounds containing —C—PO(OR)2 groups (where R= alkyl or aryl).

Phosphonates are known for use as fire retardants in various compositions. However, it was now found that they can advantageously be used in combination with the other ingredients according to the present invention in intumescent materials.

One type of phosphonate material can be used or a mixture of various phosphates can be used. For example, a combination of an arylated phosphonate and a halogenated phosphonate can be used.

Examples of suitable phosphonates include the phosphonates from the Phosflex range (ex. Supresta) or the Antiblaze range (ex Albemarle)

In the composition according to the present invention, fibres are one of the ingredients that can enhance the stability and/or strength of the char. In general, these fibres should be inert to the various reactions that take place during the curing/drying of the composition and during high heat or fire exposure of the composition. Suitable fibres include glass fibres, mineral fibres, and high temperature resistant man-made fibres, such as carbon fibres and p-aramid and m-aramid fibres.

In the composition according to the invention at least 0.05 wt. % of fibres should be present to ensure proper jet fire resistance and/or hydrocarbon performance. (wt. % is relative to the weight of the composition after evaporation of any solvent that is present in the composition)

In the composition according to the present invention various other ingredients can be present to improve wetting/surface tension/mar resistance/etc. To improve the mar resistance, the composition can contain small amounts (<3 wt. % based on the total composition) of methyl silicone resin, e.g. Silres MK powder (ex. Wacker Silicones).

The composition according to all embodiments of the present invention may further comprise a char-forming adjunct (also called carbon conversion enhancer) as an intumescent ingredient. A char-forming adjunct promotes the formation of a char when the composition is exposed to fire. Lewis acids are believed to perform this function. Preferably, phosphorus compounds such as ammonium phosphates, phosphonatosilanes, more preferably ammonium polyphosphate, phosphonic acid, phosphonic acid esters, phosphine oxide or phosphoric acid are used. It is also possible to use other char-forming adjuncts instead of or in addition to phosphorus containing compounds. Ammonium polyphosphate can be used optionally in conjunction with tris-(2-hydroxyethyl) isocyanurate (THEIC). If THEIC is used, the ratio of THEIC to ammonium phosphate preferably is between 10:1 and 1:10 and more preferably between 3:1 and 1:3.

The char-forming adjunct is preferably present in the composition according to the present invention in an amount of 5 to 30 wt %, more preferably 10 to 25 wt %, and most preferably 15 to 20 wt %, wherein the wt. % is relative to the weight of the composition after evaporation of any solvent that is present in the composition.

The composition might also contain melamine compounds, such as melamine and di melamine orthophosphate, melamine and di melamine pyrophosphate, and melamine and di melamine polyphosphate.

In the composition according to the present invention, can also contain less than 1 wt. % of a polysiloxane, wherein the wt. % is relative to the weight of the composition after evaporation of any solvent that is present in the composition.

The term "polysiloxane" is defined as a polymer which includes linear, branched, cyclic, ladder and/or cage structures and has a Si—O backbone with organic side groups attached to silicon atoms through a carbon or heteroatom linkage, wherein at least part of the silicon atoms is attached to one, two, or three oxygen atoms.

Although at least part of the silicon atoms is attached to one, two, or three oxygen atoms, it is possible for part, but not all, of the silicon atoms to be attached to four oxygen atoms.

A further intumescent ingredient that may be present in the composition according to all embodiments of the present invention is an additional source of carbon, i.e. additional to the optional organic resin. Examples of suitable additional carbon sources are pentaerythritol, dipentaerythritol, polyvinyl alcohol, starch, cellulose powder, hydrocarbon resins, chloroparaffins, and phosphated plasticisers.

Fire retardants other than chloroparafins may also be employed in the formulation (such as zinc borate). However, such added fire retardants are not necessary to achieve the unique properties of the composition according to the present invention, i.e. a combination of a superior jet fire resistance, a very good pool fire resistance, a low level of smoke generation and a good weatherability performance.

The composition of the invention may further contain solvents and/or pigments. Examples of suitable solvents are di-methylbenzene and tri-methylbenzene.

Examples of suitable pigments include titanium dioxide (white pigment), coloured pigments such as carbon black, one or more strengthening pigments, one or more anticorrosive pigments such as wollastonite or a chromate, molybdate or phosphonate, and/or a filler pigment such as barytes, talc or calcium carbonate.

The composition may also contain one or more thickening agents such as fine-particle silica, bentonite clay, hydrogenated castor oil, or polyamide wax, one or more plasticisers, pigment dispersants, stabilisers, mould releasing agents, surface modifiers, flame retardants, antibacterial agents, antimoulds, low density fillers, endothermic fillers, char promoters, fluxing aids, and levelling agents.

The composition may also contain minute particles of amorphous silica with particle sizes of about one micron or less, preferably about 3 to 500 nm. These particles assist in reducing the density of the intumescent coating. Examples of suitable minute silica particles include flame silica, arc silica, precipitated silica and other colloidal silicas. Preferably, the minute silica particles are particles of fumed silica. More preferably, the fumed silica is a surface treated silica, for instance a silica treated with dimethyldichlorosilane or hexamethyldisilazane. Even more preferably, the amorphous silica particles are polydimethylsiloxane oil-treated fumed silica particles. The composition generally cures at ambient temperatures, for example −5° to 40° C., and is thus suitable for application to large structures where heat-curing is impractical when the temperature is low. The composition of the invention alternatively may be cured at elevated temperatures, for example from 40° or 50° C. up to 100° or 130° C., if so desired. The hydrolysis of silicon-bonded alkoxy groups depends on the presence of moisture: in almost all climates atmospheric moisture is sufficient, but a controlled amount of moisture may need to be added to the composition when curing at sub-ambient temperature or when curing in very low humidity (desert) locations. The water is preferably packaged separately from any compound containing silicon-bonded alkoxy groups.

The composition according to all embodiments of the present invention preferably has a solids content of at least 50% by weight (wt %), more preferably at least 80 wt %, and most preferably at least 85 wt %, based on the total weight of the composition. The solids content is based upon a theoretical calculation of the solvent in the formulation excluding that which would be released upon curing.

The Volatile Organic Content (VOC) of the composition as present in a paint can (that is: prior to cure) preferably does not exceed 250 g/l and most preferably is less than 100 g/l solvent per litre of the composition.

The above values refer to those of the complete composition. Hence, if the composition has the form of a 2-pack composition, they refer to the solids content and the VOC of the composition after the two packs have been mixed. The composition according to all embodiments of the present invention can be applied on various substrates. It is particularly suitable to be applied on metal substrates, more in particular steel substrates. Due to the strength of the char, the intumescent may also protect structures from jet fires, i.e. high-temperature, high heat flux, high-velocity flames. Some compositions according to the present invention can thus also be applied in jet fire resistant zones.

The composition can be applied by conventional methods for applying intumescent compositions, such as spraying or troweling.

In one embodiment of the invention, the composition according to claim 1 comprises
  10-25 wt. % of a polysulfide or a mixture of polysulfides,
  2-25 wt. % of an epoxy resin or a mixture of epoxy resins,
  2-20 wt. % of a compound or mixtures of compounds selected from compounds having a secondary and/or a tertiary amine group, and compounds having an amide group,
  1-10 wt. % of a phosphonate or a mixture of phosphonates,
  0.5-10 wt. % of fibres or a mixture of fibres, and
  less than 1 wt. % of a polysiloxane,
wherein the wt. % is relative to the weight of the composition after evaporation of any solvent that is present in the composition.

In a further embodiment of the invention, the composition according to claim 1 comprises
  10-25 wt. % of a polysulfide or a mixture of polysulfides,
  2-20 wt. % of an epoxy resin or a mixture of epoxy resins,
  2-20 wt. % of a compound or mixtures of compounds selected from compounds having a secondary and/or a tertiary amine group, and compounds having an amide group,
  1-10 wt. % of a phosphonate or a mixture of phosphonates,
  0.5-10 wt. % of fibres or a mixture of fibres, and
  less than 1 wt. % of a polysiloxane,
wherein the wt. % is relative to the weight of the composition after evaporation of any solvent that is present in the composition.

In a further embodiment of the invention, the composition comprises
  20-25 wt. % of a char-forming adjunct
  18-24 wt. % of a polysulfide or a mixture of polysulfides,
  15-25 wt. % of an epoxy resin or a mixture of epoxy resins,
  11-18 wt. % of a compound or mixtures of compounds selected from compounds having a secondary and/or a tertiary amine group, and compounds having an amide group,
  7-10 wt. % of an additional source of carbon,
  1-10 wt. % of a phosphonate or a mixture of phosphonates,
  1-10 wt. % of fibres or a mixture of fibres, and
  less than 1 wt. % of a polysiloxane,
wherein the wt. % is relative to the weight of the composition after evaporation of any solvent that is present in the composition.

In a further embodiment of the invention, the composition comprises
  20-25 wt. % of a char-forming adjunct
  18-24 wt. % of a polysulfide or a mixture of polysulfides,
  15-18 wt. % of an epoxy resin or a mixture of epoxy resins,
  11-18 wt. % of a compound or mixtures of compounds selected from compounds having a secondary and/or a tertiary amine group, and compounds having an amide group,
  7-10 wt. % of an additional source of carbon,
  1-5 wt. % of a phosphonate or a mixture of phosphonates,
  1-5 wt. % of fibres or a mixture of fibres, and
  less than 1 wt. % of a polysiloxane,
wherein the wt. % is relative to the weight of the composition after evaporation of any solvent that is present in the composition.

The composition can be used as a coating to coat a substrate in whole or in part to give the substrate protection against high heat or a jet fire. The composition should at least be applied to the side of the substrate that is exposed to the high heat or jet fire. The composition is in particular suited to provide fire protection to steel, galvanised steel, aluminium, glass reinforced plastic, wood or concrete substrates.

In addition to what was already indicated above, the composition according to the present invention provides a number of advantageous properties in comparison to systems that are currently on the market and/or fire protection systems that are disclosed in various documents.

No need to use a mesh.
  Many fire protection systems that are currently on the market need a mesh reinforcement to provide sufficient structural integrity when exposed to a jet fire. The system according to the present invention shows good structural integrity even without a mesh. However, a mesh can be used to reinforce the system. In principle any mesh can be used that is capable of maintaining its structural integrity at a temperature in excess of 480° C. Examples includes carbon mesh (mesh comprising a carbon yarn or a carbon yarn precursor), or a mesh comprising other types of high temperature resistant materials or a mesh comprising a mixture of high temperature resistant material, such as carbon yarn and glass fibres, carbon yarn and steel wire, carbon yarn and ceramic fibres, steel wire and ceramic fibers, etc.

Borate free system.
  In some fire protection systems, borates are used as one of the components in the system (see e.g. WO 98/03052). Borates have been proposed for classification as reprotoxic category 2 products in accordance with EU Directive 67/548/EEC. For the system according to the present invention it is not necessary to add any borates.

The system is very durable without the need to apply a separate topcoat.
  The composition according to the present invention meets the requirements of Norsok M501 (revision 5) without the addition of a separate topcoat. This means that it is sufficient to provide the coating according to the present invention not only to give a good corrosion and fire protection to a steel surface, but also that it is not necessary to overcoat the composition to get a good appearance with good durability, even when exposed to harsh conditions.

Can be applied to a wide range of (steel) column sizes without losing its properties.

Halogen free system.
  It is not necessary to add any halogen containing components to the composition of the current invention.

Fast curing system (can be overcoated within hours)

EXAMPLES

The invention will be elucidated with reference to the following examples. These are intended to illustrate the invention but are not to be construed as limiting in any manner the scope thereof.

Example 1

A composition was prepared by mixing the following ingredients:
20 to 23 parts by weight of ammonium polyphosphate
14 to 16 parts by weight of Morton Thiokol LP3 (a polysulfide polymer)
19 to 23 parts by weight of a mixture of DER 331 and DER 736 (an epoxy resin)
13 to 16 parts by weight of a melamine resin
4 to 7 parts by weight of a mixture of high molecular weight phosphate ester and butylated triphenyl phosphate ester
5 to 9 parts by weight of Charmor DP40
3 to 6 parts by weight of titaniumdioxide
1 to 5 parts by weight of Ancamine K54
4 to 7 parts by weight of a mixture of carbon, glass, and mineral fibres This composition was applied to a steel substrate, cured, and tested for jet fire resistance, hydrocarbon performance and smoke generation and compared with some commercial materials currently on the market. For the application method, the directive of the various test methods was followed. In all systems a HK-1 fiber carbon mesh was incorporated in the coating layer. The results for Jet Fire resistance and Hydrocarbon performance are listed in Table 1. The results for smoke generation are listed in Table 2.

TABLE 1 test results jet fire resistance and hydrocarbon performance

| Test method | Material | | |
|---|---|---|---|
| | Chartek ® 7[1] | Chartek ® 8[2] | Example 1 |
| ISO22899, Jet fire @ 6 mm dft | 41 minutes | <15 minutes | 51 minutes |
| BS476-part 20, Hydrocarbon performance @ 5.4 mm dft on 105 Hp/A | 48 minutes | 58-63 minutes | 57 minutes |

[1] Chartek ® 7 is a certified high performance epoxy intumescent fireproofing coating suitable for the protection of steel, aluminium and other substrates from hydrocarbon fires, available from International Protective Coatings/AkzoNobel.
[2] Chartek ® 8 is a certified light weight high performance epoxy intumescent fireproofing coating suitable for the protection of steel, aluminium and other substrates from hydrocarbon fires, available from International Protective Coatings/AkzoNobel.

TABLE 2 test results smoke generation

| Test method | IMO standard | Example 1 |
|---|---|---|
| IMO Resolution MSC 61(67), smoke generation, test condition 3 (irradiance of 50 kW/m² in the absence of a pilot flame) | <200 | 177 |
| IMO Resolution MSC 61(67), smoke generation, test condition 1 (irradiance of 25 kW/m² in the presence of a pilot flame) | <200 | 79 |

The invention claimed is:
1. A heat resistant composition comprising:
  a polysulfide,
  an epoxy resin,
  a compound selected from the group consisting of compounds having a secondary and/or a tertiary amine group, and compounds having an amide group,
  a phosphonate or a mixture of phosphates,
  fibres, and
  about 0% wt. % of a polysiloxane,
  wherein the wt. % is relative to the weight of the composition after evaporation of any solvent that is present in the composition.
2. The composition according to claim 1 wherein the polysulfide is a polysulfide polymer.

3. The composition according to claim 1 wherein the epoxy resin is a bisphenol-type epoxy resin.

4. The composition according to claim 1 wherein the compound selected from the group consisting of compounds having a secondary and/or a tertiary amine group, and compounds having an amide group is a methylated melamine or urea resin.

5. The composition according to claim 1 wherein the phosphonate is a mixture of an arylated phosphonate and a halogenated phosphonate.

6. The composition according to claim 1 comprising
10-25 wt. % of the polysulfide or a mixture of polysulfides
2-25 wt. % of the epoxy resin or a mixture of epoxy resins
2-20 wt. % of the compound selected from the group consisting of compounds having a secondary and/or a tertiary amine group, and compounds having an amide group
1-10 wt. % of the phosphonate or a mixture of phosphonates, and
0.5-10 wt. % of the fibres or a mixture of fibres,
wherein the wt.% is relative to the weight of the composition after evaporation of any solvent that is present in the composition.

7. The composition according to claim 6, comprising
20-25 wt. % of a char-forming adjunct,
18-24 wt. % of the polysulfide or a mixture of polysulfides,
15-25 wt. % of the epoxy resin or a mixture of epoxy resins,
11-18 wt. % of the compound selected from the group consisting of compounds having a secondary and/or a tertiary amine group, and compounds having an amide group, or a mixture of the compounds,
7-10 wt. % of an additional source of carbon, and
1-10 wt. % of the fibres or a mixture of fibres,
wherein the wt. % is relative to the weight of the composition after evaporation of any solvent that is present in the composition.

8. The composition according to claim 7 wherein the additional source of carbon is selected from the group consisting of pentaerythritol, dipentaerythritol, polyvinyl alcohol, starch, cellulose powder, hydrocarbon resins, chloroparaffins, and phosphated plasticisers.

9. The composition according to claim 1, wherein the composition is a coating composition.

10. A method to improve the fire resistance of a substrate, the method comprising coating the substrate in whole or in part with the composition according to claim 1.

11. The method according to claim 10 wherein the substrate is steel, galvanised steel, aluminium, glass reinforced plastic, wood or concrete.

12. The composition according to claim 6, wherein the composition is a coating composition.

13. The composition according to claim 7, wherein the composition is a coating composition.

14. A method to improve the fire resistance of a substrate, the method comprising coating the substrate in whole or in part with the composition according to claim 6.

15. A method to improve the fire resistance of a substrate, the method comprising coating the substrate in whole or in part with the composition according to claim 7.

16. A method to improve the fire resistance of a substrate, the method comprising coating the substrate in whole or in part with the composition according to claim 8.

17. The method according to claim 14 wherein the substrate is steel, galvanised steel, aluminium, glass reinforced plastic, wood or concrete.

18. The method according to claim 15 wherein the substrate is steel, galvanised steel, aluminium, glass reinforced plastic, wood or concrete.

* * * * *